United States Patent [19]
Ishida

[11] Patent Number: 4,790,209
[45] Date of Patent: Dec. 13, 1988

[54] IMPACT ENERGY ABSORBING STEERING WHEEL

[75] Inventor: Syuichi Ishida, Ichinomiya, Japan

[73] Assignee: Toyoda Gosei Co., Ltd., Nishikasugai, Japan

[21] Appl. No.: 902,959

[22] Filed: Aug. 29, 1986

[30] Foreign Application Priority Data

Aug. 29, 1985 [JP] Japan ............................ 60-132015[U]
Aug. 29, 1985 [JP] Japan ................................ 60-190530

[51] Int. Cl.⁴ .............................................. B62D 1/04
[52] U.S. Cl. ...................................... 74/552; 280/750
[58] Field of Search ........................... 74/552; 280/750

[56] References Cited

U.S. PATENT DOCUMENTS

| | | | |
|---|---|---|---|
| 2,631,204 | 3/1953 | Kibiger | 74/552 X |
| 2,829,212 | 4/1958 | Cislo | 74/552 X |
| 3,016,764 | 1/1962 | Fredericks et al. | 74/552 |
| 3,167,974 | 2/1965 | Wilfert | 74/552 |
| 3,172,683 | 3/1965 | D'Antini | 280/750 |
| 3,675,505 | 7/1972 | Henning | 74/552 |
| 3,938,404 | 2/1976 | Murase et al. | 74/552 X |
| 4,200,309 | 4/1980 | Korn et al. | 280/750 |
| 4,368,454 | 1/1983 | Pilatzki | 74/552 X |
| 4,575,117 | 3/1986 | Uchida | 280/750 |
| 4,606,240 | 8/1986 | Sakane . | |
| 4,644,817 | 2/1987 | Albrecht et al. | 74/552 |

FOREIGN PATENT DOCUMENTS

| | | | |
|---|---|---|---|
| 3426684 | 1/1985 | Fed. Rep. of Germany | 74/552 |
| 2463708 | 4/1981 | France | 280/750 |
| 58-143766 | 9/1983 | Japan . | |
| 58-42231 | 9/1983 | Japan | 74/552 |
| 58-135363 | 9/1983 | Japan | 74/552 |
| 1323209 | 7/1973 | United Kingdom | 74/552 |

Primary Examiner—Gary L. Smith
Assistant Examiner—Rodney M. Lindsey
Attorney, Agent, or Firm—Cushman, Darby & Cushman

[57] ABSTRACT

An impact energy absorber of a steering wheel is formed of a thin metal sheet and is disposed within a cover pad above a boss plate in a boss portion of the steering wheel. The impact energy absorber is composed of an annular base portion which is supported by a supporting member above the boss plate with a predetermined inner space between the base portion and the boss plate, and a plurality of leg portions which are protruded inwardly from the inner periphery of the base portion and are thereafter bent upward so as to be brought into contact with the inner wall of the upper portion of the cover pad. When impact is applied to the cover pad, the impact energy absorber absorbs the impact energy by deforming the lower portion of each leg portion by bending it from the inner periphery of the base portion and inserting it to the inner space between the base portion and the boss plate.

13 Claims, 5 Drawing Sheets

IMPACT ENERGY ABSORBING STEERING WHEEL

BACKGROUND OF THE INVENTION

The present invention relates to an absorber which is provided within the cover pad above the boss plate in the boss portion of a vehicle steering wheel in order to absorb impact energy when impact is applied to the cover pad and, more particularly, to a shock energy absorber composed of a thin metal sheet.

Impact absorbers of this kind are generally composed of a metal sheet which is bent into a U-shaped configuration and disposed between a cover pad and a boss plate. When an impact load is applied to the cover pad, the impact absorber is buckled to absorb the impact energy.

However, in order to absorb impact energy solely by means of such an impact energy absorber, it is necessary to make the absorber have at least a certain minimum thickness which fact makes it difficult to reduce the steering wheel in weight. Referring to FIG. 1 to solve this problem, it has previously been proposed that the deformation of a cover pad 3 itself and the interference action between the cover pad 3 and an impact energy absorber 4 also be utilized for absorption of impact energy when an impact load is applied, thereby reducing the impact energy absorber in thickness and weight, as shown in FIG. 1.(See Japanese Utility Laid-Open No. 143766/1983).

The impact energy absorber 4 is disposed within substantially square box-shaped cover pad 3 in a boss portion 1, and has, as a conventional absorber, an upper plate 4a provided along the inner wall of the upper portion 3a of the cover pad 3 and side plates 4b and 4c which are bent downward from both ends of the upper plate 4a such as to be disposed along the inner wall of the side portion 3B of the cover pad 3. The impact energy absorber 4 is composed of a steel sheet which is bent so as to have a U-shaped cross-section and is thinner-walled than a atheretofore conventional one.

The lower ends of the side plates 4b and 4c are bent inwardly. A U-shaped clip 5a is provided at the lower portion of the lower end 4d of the side plate 4b so as to be retained to the peripheral edge of a boss plate 2, and the lower end 4e of the side plate 4c is secured to a retaining piece 6 which is secured to the under surface of the peripheral edge of the cover pad 3 by a screw 8. An adapter piece 9 which is attachable to a support plate 11 through a screw 10 which is secured to the boss plate 2 by a screw 12 is fixed to the retaining piece 6.

The cover pad 3 is so formed as to have a lower rigidity than the impact energy absorber 4 and is composed of a coating layer 3a made of a soft synthetic resin material, and an insert 3b made of a hard synthetic resin material for providing a certain amount of retention of shape for the cover pad 3.

When an impact load is applied in a substantially perpendicular direction to the cover pad 3, since the upper and lower ends of the side plates 4b and 4c of the impact energy absorber 4 are respectively bend inwardly, the deformation of the impact energy absorber 4 takes the form of buckling deformation in which a bending point of each of the side plates 4b and 4c protrudes outwardly, so as to interfere with the inner wall of the side portion 3B of the cover pad 3. Thus, in this steering wheel, impact energy is absorbed by deformation of the impact energy absorber 4, deformation of the cover pad 3 and interference between the cover pad 3 and the impact energy absorber 4 (force for suppressing the deformation of both members, frictional force, and the like).

However, in order to utilize the deformation of the cover pad 3 and the interference action between the cover pad 3 and the impact energy absorber 4 for absorption of impact energy as in this proposal, it is necessary to set the rigidity of the cover pad 3 within a predetermined range, which requires much labor for production of the cover pad 3.

SUMMARY OF THE INVENTION

Accordingly, it is an object of the present invention to eliminate the above-described problems in the prior art and to provide an impact energy absorber for a steering wheel, which is capable of absorbing a predetermined amount of energy without utilizing the interference action with a cover pad and while maintaining reduced weight of the steering wheel.

To achieve this aim, an impact energy absorber according to the present invention is made of a thin metal sheet, is disposed within a cover pad above a boss plate in a boss portion of a steering wheel, and is composed of an annular base portion provided above the boss plate and supported by a supporting member with a predetermined inner space between the base portion and the boss plate, and a plurality of leg portions which protrude inwardly from the inner periphery of the base portion and are bent upward so as to come into contact with the upper inner wall portion of the cover pad.

The impact energy absorber of the steering wheel in accordance with the present invention is characterized in that the plurality of leg portions which are in contact with the upper inner wall portion of the cover pad are bent after the respective lower portions are protruded inwardly from the inner periphery of the base portion, and in that the base portion is supported by the supporting member above the boss plate with a predetermined inner space between the base portion and the boss plate. Therefore, when an impact load is applied to the cover pad, each leg portion of the impact energy absorber subsequently bends, in the lower portion thereof, from the inner periphery of the base portion, and inserts it into the inner space between the base portion and the boss plate, thereby absorbing the impact energy.

In other words, in the impact energy absorber of the steering wheel of the present invention, the bending point of each leg portion is inserted subsequently into the inner space and the bending point therefore subsequently shifts from a lower portion toward an upper portion, unlike the buckling deformation in a conventional impact energy absorber in which only one point is bent. As a result, even if the impact energy absorber is formed so as to have reduced thickness and weight, the amount of energy absorption is large and a predetermined amount of energy absorption is obtained without utilizing the interference action with the cover pad. Consequently, it is unnecessary to take the rigidity of the cover pad into consideration, and the degree of freedom with respect to the shape, structure and material of the cover pad is enlarged, thereby facilitating the production of the cover pad.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
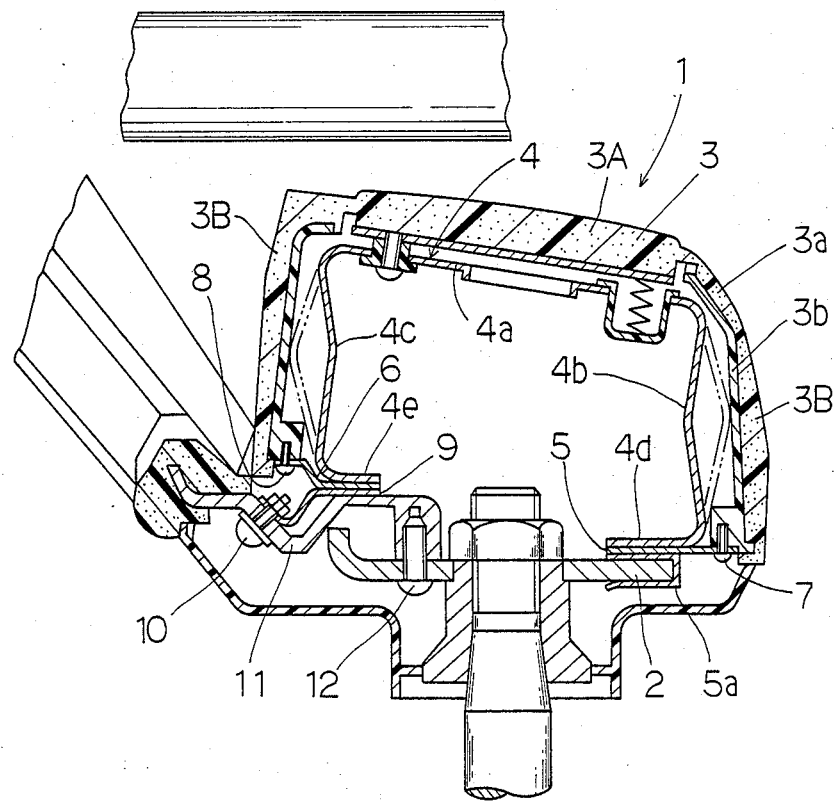
FIG. 1 is a sectional view of a conventional impact energy absorber.

An embodiment of the present invention will be described hereinunder with reference to the accompanying drawings. An impact energy absorber 24 of this embodiment is disposed within a cover pad 23 above a boss plate 22 in a boss portion 21 of a steering wheel W, as in the prior art.

The impact energy absorber 24 is formed of a rectangular thin metal sheet which is punched into a predetermined configuration and predetermined portions are bent so as to be integrally composed of a substantially square base portion 24a and three opposing leg portions 24b which are protruded inwardly from three portions of the inner periphery of the base portion 24a and thereafter bent upward.

The upper end of each leg portion 24b is bent inwardly and is welded to a contact sheet 28 having rigidity in a horn switch mechanism 25.

The horn switch mechanism 25 is brought into contact with an upper inner wall 23a of the cover pad 23, and is integrally composed of a contact plate 26 provided with a contact point 26a at a predetermined point and flexible downwardly, an annular insulating spacer 27 provided on the periphery of the contact plate 26, and the contact sheet 28 provided with a contact point 28a which corresponds to the contact point 26a, in that order, from the top. The contact plate 26 is electrically connected to a slip ring 30 which is the anode side of a horn actuating circuit through a lead wire 29, and the contact sheet 28 to the boss 44 which is the cathode side of the horn actuating circuit through the impact energy absorber 24, later-described support members 36 and 39, tongue 33 and the like.

The base portion 24a of the impact energy absorber 24 is provided with through holes 34 at the four corners, and the impact energy absorber 24 together with the horn switch mechanism 25 and later described support members 35 and 36 is secured to the inner wall of the side portions 23b of the cover pad 23 through these through holes 34 by screws 32.

The cover pad 23 is composed of a coating layer 23a made of a soft synthetic resin such as polyurethane which has lower rigidity than the impact energy absorber 24 and does not influence the deformation of the impact energy absorber 24 when an impact load is applied, and an insert 23b made of a hard synthetic resin such as PA.ABS resin which has a certain extent of retention of shape.

To the undersurface of the base portion 24a of the impact energy absorber 24 are welded the support members 35 and 36 which protrude downwardly in an opposed state.

These support members 35 and 36 are engaged with support members 39 and 40 which are secured to a lower cover 31 at the periphery of the boss plate 22. These support members 35 and 36 constitute a predetermined inner space X between the inner periphery of the base portion 24a of the impact energy absorber 24 and the boss plate 22, so that when an impact load is applied to the cover pad 23, the leg portions 24b of the impact energy absorber 24 are deformed without any trouble and inserted into the inner space X.

The lower cover 31 is made of a hard resin material such as PP, and is disposed such as to surround the boss 44 and the boss plate 22. The lower cover 31 is integrally composed with the coating layer of the under surface of the spoke portion S and the ring portion R of the steering wheel W. The reference numeral 45 denotes a cover body made of a synthetic resin such as PP which is provided such as to fill the gap between the lower cover 31 and the cover pad 23 and to cover the upper portion of the spoke portion S.

The support members 35, 36, 39 and 40 are composed of two kinds of members, namely clamp-engaging members 36 and 40, and insertion-engaging members 35 and 39.

The clamp-engaging member 36 is composed of a support piece 37 made of a metal sheet with the upper end welded to the base portion 24a in a bent state, and a retaining piece 38 made of a spring leaf which is connected to the support piece 37 substantially in parallel thereto in the vicinity of the upper end thereof by burring. A projection 38a which projects toward the support piece 37 is formed in the vicinity of the lower end of the retaining piece 38. The gap between the lower ends of the support piece 37 and the retaining piece 38 are gradually made larger toward the end so as to easily receive the insertion-engaging member 39.

The insertion-engaging member 35 is made of a metal sheet and the upper end thereof is bent and welded to the undersurface of the base portion 24a while the lower end is extended straightly downward with an intermediate portion slightly bent and provided with a rectangular retaining hole 35a.

The insertion-engaging member 39 on the side of the lower cover 31 is screwed to the lower cover 31 through threaded holes 39b formed in the vicinity of both sides. The upper end of the insertion-engaging member 39 is straightly extended upward, and at an intermediate portion thereof a rectangular retaining hole 39a is formed, as in the case of the insertion-engaging member 35 of the base portion 24a. The retaining hole 39a is formed in the position through which the projection 38a of the retaining piece 38 is inserted when the insertion-engaging member 39 is inserted between the support piece 37 and the retaining piece 38 at the clamp engaging member 36 of the base portion 24.

The tongue 33 made of a conductive material is secured to the lower end of the insertion-engaging member 39 by burring. The tongue 33 comes into contact with the boss 44 when the insertion-engaging member 39 is attached thereto. The tongue 33 electrically connects the contact sheet 28 through the cathode side boss 44 of the horn-actuating circuit through the impact energy absorber 24, the clamp engaging member 36, the insertion-engaging member 39 and the tongue 33.

The clamp-engaging member 40 on the side of the lower cover 31 is, as is the case with the clamp-engaging member 36, composed of a support piece 41 of a metal sheet, and a retaining piece 42 made of a spring leaf with the lower end thereof connected to the support piece 41 in substantial parallel thereto by burring. A threaded hole 41a is made in the lower end of the support piece 41 of the clamp-engaging member 40, through which a screw 43 is penetrated from the outer surface of the lower cover 31 so as to fix the clamp-engaging piece 40 to the lower cover 31. A projection 42a which projects toward the support piece 41 when the insertion-engaging member 35 on the side of the base portion 24a is inserted between the support piece 41 and the retaining piece 42 is provided in the vicinity of the upper end of the retaining piece 42 The lower ends of the support piece 37 and the retaining piece 38 are tapered with an open space between them so as to easily receive the insertion-engaging member 39. The projection 42a is provided with a partially cutout portion 42b which is engaged with the lower portion of the periphery of the retaining hole 35a so as to prevent the insertion-engaging portion 35 from slipping off. The gap between the upper ends of the support piece 41 and the retaining piece 42 are gradually made larger toward the end so as to easily receive the insertion-engaging member 35 as well as the clamp-engaging member 36.

Figure 5:
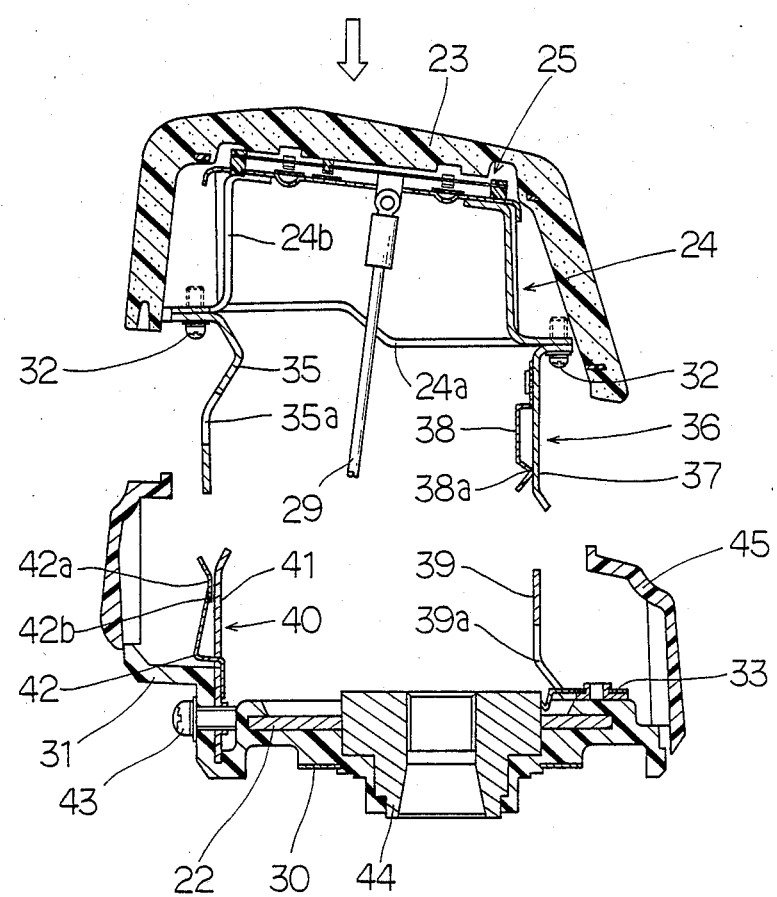
FIG. 5 is a sectional view of the impact energy absorber of the embodiment of FIG. 2 in a state before it is mounted on the steering wheel.

The arrangement for attachment of these support members 35, 36, 39 and 40 will be here explained. As shown in FIG. 5, the clamp-engaging member 36 and the insertion engaging member 35 on the side of the impact energy absorber 24 is first disposed above the insertion-engaging member 39 and the clamp-engaging member 40 on the side of the lower cover 21 in a state the cover pad 23 is secured to the impact energy absorber 24 through the horn switch member 25, whereby the insertion-engaging members 35 and 39 are inserted between the support pieces 37 and 41 and the retaining pieces 38 and 42 of the respective clamp-engaging members 36 and 40. The protrusions 38a and 42a of the respective retaining pieces 38 and 42 are deformed elastically and inserted into the respective retaining holes 35a and 39a. The lower portion of the periphery of the retaining hole 35a of the insertion-engaging member 35 is retained by the partially cutout portion 42b which is formed on the projection 42a of the retaining piece 42 of the corresponding engaging member 40, so that the impact energy absorber 24 with the cover pad 23 secured thereto is unremovably attached to the lower cover 31.

Thus, according to the structure of the support members in this embodiment, it is possible to easily attach the impact energy absorber 24 with the cover pad 23 secured thereto simply by pressing the cover pad 23 and the impact energy absorber 24 downwardly from the above the lower cover 31 in order to attach it to the lower cover 32 and, in addition, it is similarly easy when the side portion of the position to which the impact energy absorber 24 is to be attached is covered with the cover body 45.

Figure 4:
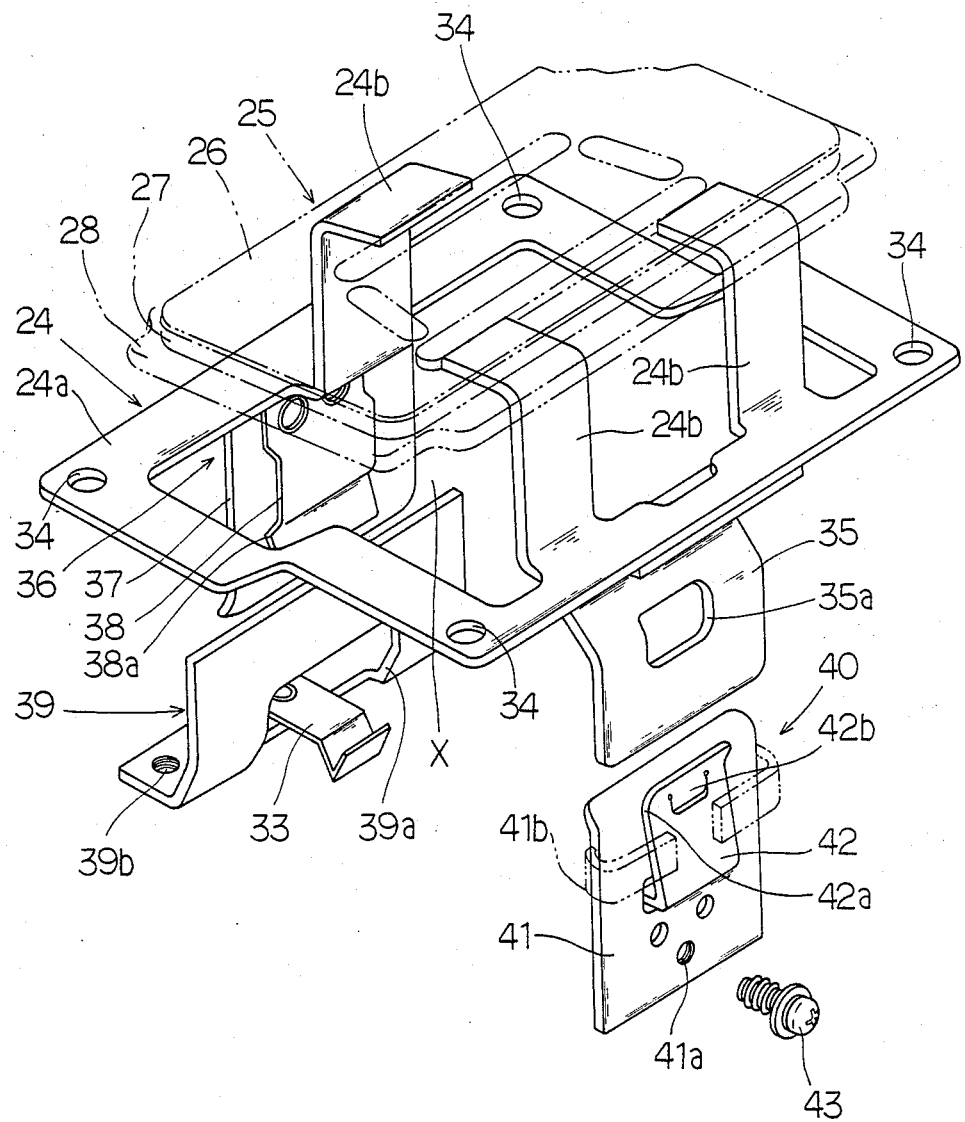
FIG. 4 is a perspective view of an impact energy absorber o embodiment shown in FIG. 2.

It is possible to prevent the cover pad 23 and the impact energy absorber 24 from horizontally getting out of the position when the clamp-engaging member 40 is engaged with the insertion-engaging member 35 by making the widths of the clamp-engaging member 40 and the insertion-engaging member 35 equal and providing a holding piece 41b on the support piece 40, as indicated by the broken line in FIG. 4.

When the cover pad 23 and the impact energy absorber 24 are removed from the lower cover 31 side, the screw 43 which fastens the clamp-engaging member 40 having the partially cutout portion 42b on the side of the lower cover 31 is first removed. The cover pad 23 is then strongly pulled upwardly so that the clamp-engaging member 40 which is screwed is separated from the lower cover 31 while the clamp-engaging member 40 is engaged with the insertion-engaging member 35. As to the clamp-engaging member 36 and the insertion-engaging member 39 on the other side, the projection 38a of the retaining piece 38 is elastically deformed and is slipped of the retaining hole 39a, whereby the cover pad 23 and the impact energy absorber 24 are easily removed from the lower cover 31 side.

Although the two clamp-engaging members 36 and 40 are disposed on the side of the impact energy absorber 24 and on the side of the lower cover 31 to which the impact energy absorber 24 is to be attached, respectively, in this embodiment, it is naturally possible to dispose only one of them on the side of either the impact energy absorber 24 or the lower cover 31, or to disposed three or more clamp-engaging members at appropriate positions.

The clamp-engaging member 40 provided with the partially cutout portion is fastened to the lower cover 31 by the screw 43 in this embodiment, but, alternatively, the insertion-engaging member 35 which corresponds to the clamp engaging member 40 may be screwed to the impact energy absorber 24.

Furthermore, although the lower cover 31 is illustrated as the position to which the support members 39 and 40 are attached in this embodiment, it may be replaced by the boss plate 44.

Figure 2:
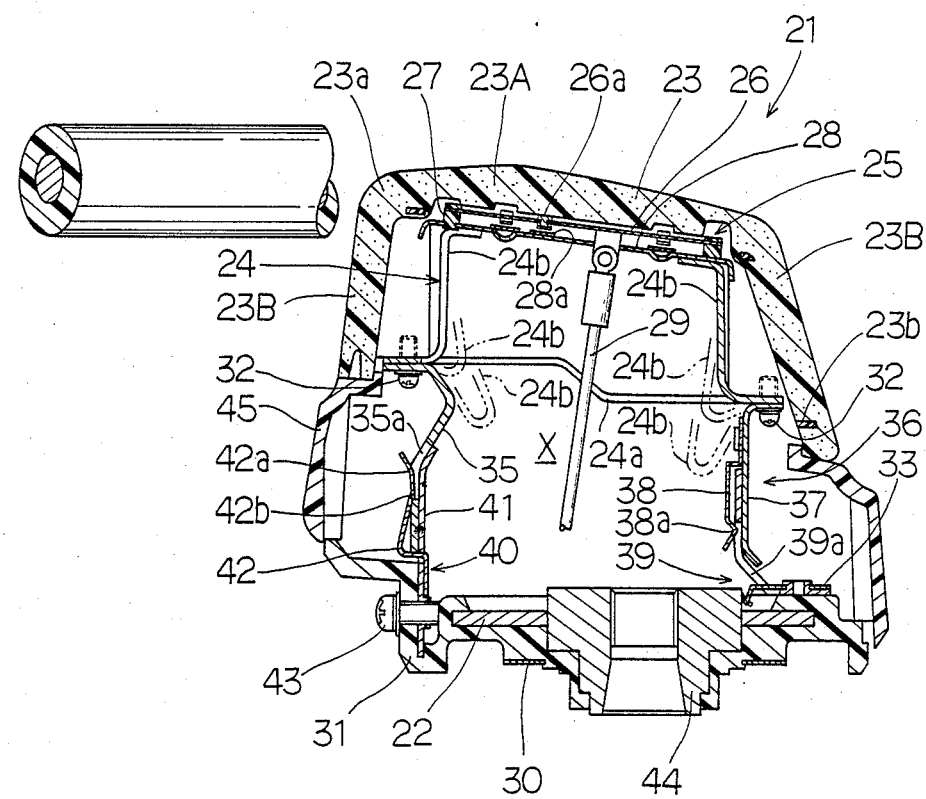
FIG. 2 is a sectional view of an embodiment of an impact energy absorber of a steering wheel according to the present invention in the mounted state, taken along the line II—II in FIG. 3.
Figure 3:
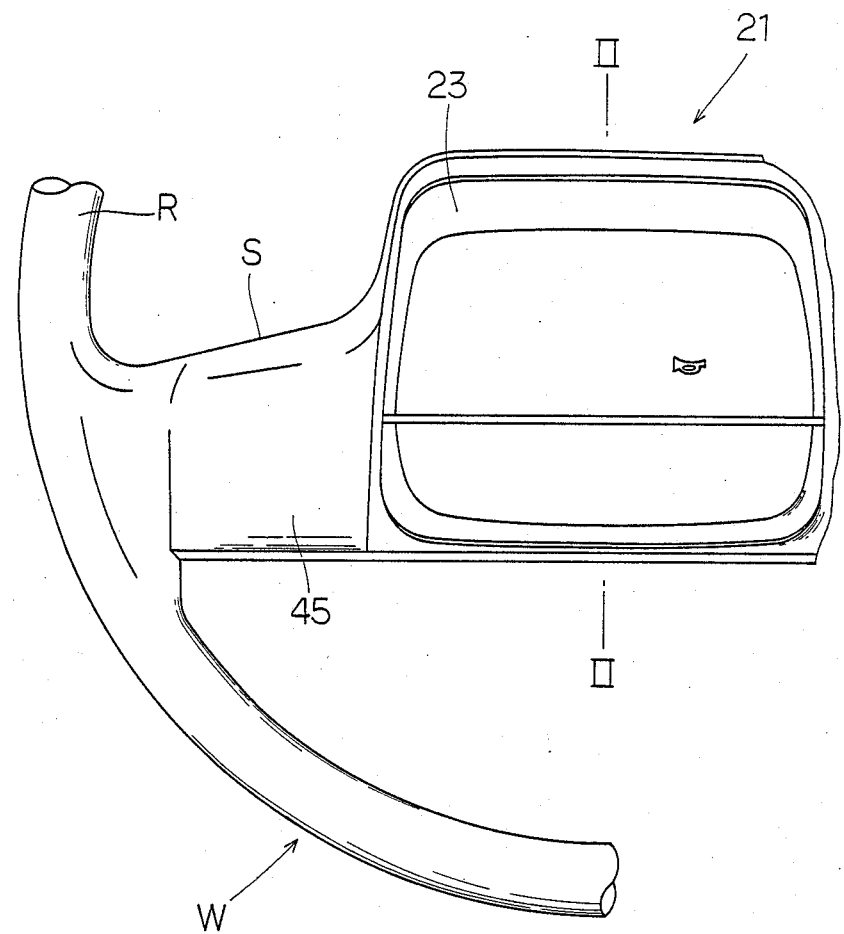
FIG. 3 is a fragmentary plan view of a steering wheel of the embodiment shown in FIG. 2.

When an impact load is applied to the cover pad 23, for example substantially in the vertical direction, the impact energy absorber 24 provided in this way absorbs impact energy by inserting the bent portion of the leg portion 24b into the inner space X and deforming the leg portion 24b such as to subsequently shift the bent position from a lower portion to an upper portion, as indicated by the broken line in FIG. 2. In other words, the impact energy absorber 24 deforms the leg portion 24b such as to insert a bent portion into the inner space X and subsequently shift the bent portion from the leg portion 24b to an upper portion, unlike the buckling deformation of the conventional impact energy absorber 4 in which only one point is bent. As a result, even if the impact energy absorber 24 is formed in reduced thickness and weight, the amount of energy absorption is large and a predetermined amount of energy absorption is obtained without utilizing interference action with the cover pad. Consequently, it is unnecessary to take the rigidity of the cover pad into careful consideration, and the degree of freedom with respect to the shape, structure and material of the cover pad is enlarged, thereby facilitating the production of the cover pad.

The impact energy absorber 24 of this embodiment is composed of a sheet material which is punched into a predetermined shape and is thereafter bent at predetermined positions so as to form the leg portions 24b, thereby facilitating manufacture.

Although, in the impact energy absorber 24 of this embodiment the upper portion 23A of the cover pad 23 is brought into contact with the inner wall through the horn switch mechanism 25, which is connected to the upper ends of the leg portions 24b, the upper ends of the leg portions 24b may be directly brought into contact with the inner wall of the upper portion 23A of the cover pad 23 when the horn switch mechanism 25 is provided a the spoke portion S, and need not be provided within the cover pad 23.

In consideration of the working efficiency in the assembly of the impact energy absorber 24 to the steering wheel W, the predetermined support members 35, 36, 39 and 40 are used in the impact energy absorber 24 of this embodiment. However, these support members 35, 36, 39 and 40 are dispensed with if a support piece which is extended from the boss plate 22 or the lower cover 31 is connected to the undersurface of the base portion 24a of the impact energy absorber 24 so as to support the base portion 24a, and the inner space X is formed between above the boss plate 22 and between the base portion 24a and the boss plate 22 such as not to obstruct the deformation of the leg portions 24b. On the other hand, when the horn switch mechanism 25 or the impact energy absorber 24 is not provided on the back surface of the cover pad 23, it is possible improve the working efficiency in the assembly of the cover pad 23 itself to the steering wheel W by securing predetermined support members among the support members 35, 36, 39 and 40 to the back surface of the cover pad 23, the boss plate 22 and the lower cover 31. While there has been described what is at present considered to be a preferred embodiment of the invention, it will be understood that various modifications may be made thereto, and it is intended that the appended claims cover all such modifications as fall within the true spirit and scope of the invention.

What is claimed is:

1. An impact energy-absorbing steering wheel, comprising:
   a steering wheel having an axially-central boss portion having an upper end provided with a boss plate having an outer periphery;
   a cover pad having an upper end wall and a depending peripheral sidewall means;
   said cover pad being arranged on said steering wheel boss portion and having said sidewall means thereof juxtaposed with said outer periphery of said boss plate so as to enclose above said boss plate an inner space;
   an impact energy absorber, comprising:
   (a) support means secured on said boss portion and including at least two laterally-spaced support members which project axially upwardly from respective sites located near said outer periphery of said boss plate radially within bounds of said inner space;
   (b) a thin metal sheet having a transversally extending annular base flange portion from which at least two laterally spaced leg portions project axially upwardly from respective sites, said leg portions having upper ends;
   (c) transversally extending plate means secured with an interconnecting said upper ends of said leg portions; and
   (d) first connecting means provided on said support members of said support means engaged with second connecting means provided on further support members provided on said base flange portion of said thin metal sheet for securing said thin metal sheet in place on said support means with said leg portions of said thin metal sheet occupying radially outer portions of said inner space and said transversally extending plate occupying an axially upper portion of said inner space, with both said thin metal sheet and said transversally extending plate being enclosed by said cover pad and said transversally extending plate being located under and adjacent said upper end wall of said cover pad;
   said leg portions of said thin metal sheet being composed and shaped to comprise a bending point to bend, upon delivery of an axially downward impact force on said cover pad, downwardly and inwardly, in a folded manner, so as to become disposed at least partially axially below said annular base flange portion of said thin metal sheet.

2. The steering wheel of claim 1, wherein:
   said leg portions of said thin metal sheet are integrally formed on an inner periphery of said annular base flange portion of said thin metal sheet.

3. The steering wheel of claim 1, further including:
   a horn circuit contact plate provided on said upper end wall of said cover pad in said inner space between said upper end wall of said cover pad and said transversally extending plate of said impact energy absorber; and
   insulating spacer means provided between corresponding portions of said transversally extending plate and said horn circuit contact plate whereby said horn circuit contact plate and said transversally extending plate may serve as respective portions of a switch for a horn circuit.

4. The steering wheel of claim 1, wherein:
   said transversally extending plate is rigid relative to said upper end wall of said cover pad.

5. The steering wheel of claim 1, wherein:
   said first and second connecting means respectively provided on said support members of said support means and said further support members of said base flange portion of said thin metal sheet are disengageably engaged.

6. The steering wheel of claim 5,
   said first and second connecting means are constructed to engage, by relative axial movement of said thin metal sheet telescopically axially towards said boss plate.

7. The steering wheel of claim 6, wherein:
   said first and second connecting means collectively include a clamp-engaging member and an insertion-engaging member, each said insertion-engaging member being inserted within and clamped by a respective said clamp engaging member.

8. The steering wheel of claim 1, wherein:
   said first and second connecting means collectively include a clamp-engaging member and an insertion-engaging member, each said insertion-engaging member being inserted within and clamped by a respective said clamp engaging member.

9. The steering wheel of claim 8, wherein:
   said transversally extending plate is rigid relative to said upper end wall of said cover pad.

10. The steering wheel of claim 9, wherein:
    said leg of said thin metal sheet are integrally formed on an inner periphery of said annular base flange portion of said thin metal sheet.

11. The steering wheel of claim 10, further including:
    a horn circuit contact plate provided on said upper end wall of said cover pad in said inner space between said upper end wall of said cover pad and said transversally extending plate of said impact energy absorber; and insulating spacer means provided between corresponding portions of said transversally extending plate and said horn circuit contact plate whereby said horn circuit contact plate and said transversally extending plate may serve as respective portions of a switch for a horn circuit.

12. The steering wheel of claim 11, wherein:

said sidewall means of said cover pad has an axially lower end located above said boss plate; and further including:

an annular lower cover mounted to said boss plate and extending axially upwards so that an upper end thereof is telescopically related with said lower end of said sidewall means of said cover pad.

13. The steering wheel of claim 1, wherein:

said sidewall means of said cover pad has an axially lower end located above said boss plate; and further including:

an annular lower cover mounted to said boss plate and extending axially upwards so that an upper end thereof is telescopically related with said lower end of said sidewall means of said cover pad.

* * * * *